United States Patent
Wakamatsu et al.

(10) Patent No.: US 6,522,344 B1
(45) Date of Patent: *Feb. 18, 2003

(54) METHOD AND APPARATUS FOR DATA FILE CREATION AND RECORDING MEDIUM FOR THE SAME

(75) Inventors: Hidehisa Wakamatsu, Kawasaki (JP); Keiichi Ogawa, Ishikawa (JP); Masaharu Noguchi, Matsumoto (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,240

(22) Filed: Mar. 16, 1998

(30) Foreign Application Priority Data

Mar. 19, 1997 (JP) .............................. 9-066133

(51) Int. Cl.⁷ .............................. G06K 15/00
(52) U.S. Cl. ...................... 345/749; 345/746
(58) Field of Search ............... 345/328, 327, 345/341, 326, 340, 342–347, 348–349, 350–351, 356–357, 333–334, 705–713, 767, 778, 817, 746, 747, 748, 812, 749, 788

(56) References Cited

U.S. PATENT DOCUMENTS

| | | | | |
|---|---|---|---|---|
| 5,159,546 A | * | 10/1992 | Inoue et al. ............ | 700/17 |
| 5,204,947 A | * | 4/1993 | Bernstein et al. ....... | 345/356 |
| 5,297,249 A | * | 3/1994 | Berenstein et al. ...... | 345/356 |
| 5,418,941 A | * | 5/1995 | Peters ................... | 395/575 |
| 5,555,369 A | * | 9/1996 | Menendez et al. ....... | 345/333 |
| 5,786,815 A | * | 7/1998 | Ford .................... | 345/746 |
| 5,828,370 A | * | 10/1998 | Moeller et al. .......... | 345/328 |
| 5,852,733 A | * | 12/1998 | Chien et al. ............ | 717/1 |
| 5,861,880 A | * | 1/1999 | Shimizu et al. ......... | 345/302 |
| 5,867,729 A | * | 2/1999 | Swonk ................... | 395/828 |
| 5,874,952 A | * | 2/1999 | Morgan .................. | 345/328 |
| 5,877,781 A | * | 3/1999 | Tomizawa et al. ........ | 345/521 |
| 5,880,722 A | * | 3/1999 | Brewer et al. ........... | 345/328 |
| 5,889,514 A | * | 3/1999 | Boezeman et al. ........ | 345/302 |
| 5,914,713 A | * | 6/1999 | Nario et al. ............ | 345/746 |
| 5,920,718 A | * | 7/1999 | Uczekaj et al. .......... | 395/702 |
| 5,924,109 A | * | 7/1999 | Ackerman et al. ........ | 707/531 |
| 5,961,620 A | * | 10/1999 | Trent et al. ............ | 710/105 |
| 5,990,891 A | * | 11/1999 | Fukaya .................. | 345/812 |
| 6,006,230 A | * | 12/1999 | Ludwig et al. ........... | 707/10 |
| 6,088,028 A | * | 7/2000 | Gipalo .................. | 345/744 |
| 6,157,363 A | * | 12/2000 | Haine ................... | 345/745 |
| 6,160,550 A | * | 12/2000 | Nakajima et al. ......... | 345/746 |

* cited by examiner

Primary Examiner—Steven Sax
(74) Attorney, Agent, or Firm—Staas & Halsey LLP

(57) ABSTRACT

The invention is directed to the provision of a method and apparatus for video data file creation and a recording medium for use with the same, and a primary object of the invention is to make video data edited in a prescribed format viewable on a computer where the application used to create the video data is not installed. The video data file creation apparatus comprises a video data creation means for editing display data shown on a display into a designated format, and for creating an executable video data file by appending display producing means to the edited display data. The video data creation means retrieves from a storage device a data file to be processed in an application processing means and, in accordance with a user-specified instruction item, edits the video data file obtained by processing the data file; the video data creation means then appends the display producing means to the edited video data file, thus creating the executable video data file.

22 Claims, 10 Drawing Sheets

METHOD AND APPARATUS FOR DATA FILE CREATION AND RECORDING MEDIUM FOR THE SAME

BACKGROUND OF THE INVENTION

1. Field of the Invention

The present invention relates to a method and apparatus for video data file creation and a recording medium for the same, and more particularly to a method and apparatus, for video data file creation, wherein the video data file creation apparatus, incorporating a computer equipped with a graphical user interface, creates a video data file in accordance with user-selected action items or by predicting user action or even analyzing source data, and a recording medium for use with the same.

2. Description of the Related Art

In a computer system, when a user operates an application on a computer such as a personal computer and the display screen changes correspondingly, to keep a record of the events, it has been practiced to create a data file as source data by saving data representing the part of the application used within the screen data, and to create a video data file by converting the data file into screen data for reproduction by using a conversion program included in the application.

For example, to reference a data file Y edited using a word processing program from Company A and to display the result of the reference on a terminal 10 of a computer system P, as shown in FIG. 1A, if an application X, which is the word processing program from Company A, is already installed on the terminal 10, the result of the reference based on the data file Y can be reproduced for viewing by using the application X. That is, the data file Y can be displayed in a format that the user can recognize. Usually, an application Xn has a one-to-one correspondence with a data file Yn.

However, as shown in FIG. 1B, in a computer system Q where the application X is not installed, even if a word processing program W from Company B is installed there, the data file Y cannot be viewed on its terminal 20, etc. This is true not only of word processing but also of other data processing.

Further, in a conventional video file creation system, it has also been practiced to photograph a monitor screen by a user using a camera, but this has required the user's action to focus the camera on the monitor screen and capture the video, that is, the user has had to operate the hardware when creating a video data file.

Accordingly, to make the data file Y viewable on the computer terminal, the application X capable of displaying the data file Y for viewing has had to be installed on the computer system. However, installing an application on a computer system in general involves the following problems.

1. Installing an application requires a certain amount of storage space on a storage device in the computer system.
2. When the application X is installed for a test purpose, it has to be uninstalled after finishing the test.
3. Installation may affect the computer system and may introduce some changes to the system environment.
4. Since installation requires a certain amount of time, the user cannot quickly reference a data file he wises to reference; the user can reference the desired data file only after installing the application.

SUMMARY OF THE INVENTION

It is accordingly an object of the present invention to provide a video data file creation apparatus that converts a data file Y created by an application X into video data in accordance with user-selected edit instruction items or by predicting user action or analyzing the content of the data file Y, and that creates an executable file of an EXE (EXECUTION) format incorporating an application for the reproduction of the video data so that the data file Y can be viewed on a computer system where the application X is not installed.

With such a predefined and simple set of operations, a video data file viewable on any computer system can be created.

According to the present invention, there is provided a video data file creation apparatus incorporating a computer equipped with a user interface, comprising video data creation means for editing display data shown on a display into a designated format, and for creating an executable video data file by appending display producing means to the edited display data, wherein the video data creation means edits, in accordance a user-specified edit instruction item, a video data file obtained by processing a data file to be displayed, and creates the executable video data file by appending the display producing means to the edited video data file.

The user-specified edit instruction item is given in the form of a menu item. Further, the video data creation means is incorporated as part of an application by which said data file to be displayed is created.

According to the present invention, there is also provided a video data file creation apparatus incorporating a computer equipped with a user interface, comprising video data editing means for editing display data shown on a display into a designated format, wherein the video data editing means predicts user action to be performed on a video data file obtained by processing a data file to be displayed, and edits the video data file in accordance with the predicted user action.

The apparatus further comprises display producing means for converting the edited video data file into an executable video data file. The predicted user action includes, for example, scrolling a text display screen area.

According to the present invention, there is also provided a video data file creation apparatus incorporating a computer equipped with a user interface, comprising video data editing means for editing display data shown on a display into a designated format, wherein the video data editing means analyzes the content of a data file to be displayed and, based on the result of the analysis, edits the data file in accordance with a user-specified edit instruction item.

The apparatus further comprises display producing means for converting the edited video data file into an executable video data file. The video data editing means is provided as a stand-alone application. Further, the data file to be displayed is dragged to the video data editing means.

The present invention also provides the following methods.

According to the present invention, there is provided a method for creating a video data file for viewing on a computer, comprising: creating a corresponding video data file from a data file to be displayed, by using a processing program for the data file; editing the video data file in accordance with a user-specified edit instruction item; and creating an executable video data file by appending display producing means to the edited video data file.

According to the present invention, there is also provided a method for creating a video data file for viewing on a computer, comprising: creating a corresponding video data file from a data file to be displayed, by using a processing program for the data file; and predicting user action to be performed on the video data file, and editing the video data file in accordance with the predicted user action. To accomplish this, the method also includes converting the edited video data file into an executable video data file.

According to the present invention, there is also provided a method for creating a video data file for viewing on a computer, comprising: creating a corresponding video data file by analyzing the content of a data file to be displayed; and editing, based on the result of the analysis, the video data file in accordance with a user-specified edit instruction item. To accomplish this, the method also includes converting said edited video data file into an executable video data file.

The present invention further provides the following recording media.

According to the present invention, there is provided a recording medium for recording a computer-readable program for implementing the functions of: processing a data file to be displayed and creating a corresponding video data file therefrom; editing the created video data file in accordance with a user-specified edit instruction item; and creating an executable video data file by appending display producing means to the edited video data file.

According to the present invention, there is also provided a recording medium for recording a computer-readable program for implementing the functions of: processing a data file to be displayed and creating a corresponding video data file therefrom; and predicting user action to be performed on the created video data file, and editing the video data file in accordance with the predicted user action. To accomplish this, the program also includes the function of converting the edited video data file into an executable video data file.

According to the present invention, there is also provided a recording medium for recording a computer-readable program for implementing the functions of: processing a data file to be displayed and creating a corresponding video data file therefrom; creating a video data file by using the corresponding processing function obtained by analyzing the content of the data file to be displayed; and editing, based on the result of the analysis, the video data file in accordance with a user-specified edit instruction item. To accomplish this, the program also includes the function of converting the edited video data file into an executable video data file.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Figure 1A:
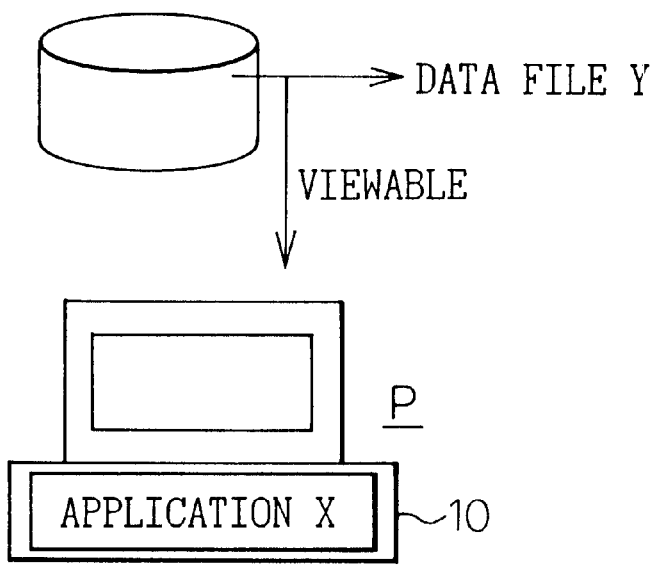
FIG. 1A is an explanatory diagram (1) illustrating an operational example of the prior art.
Figure 1B:
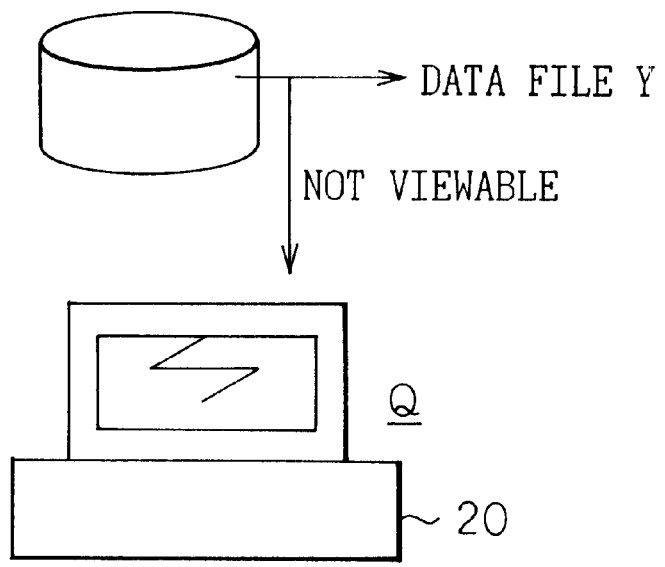
FIG. 1B is an explanatory diagram (2) illustrating the operational example of the prior art.
Figure 2:
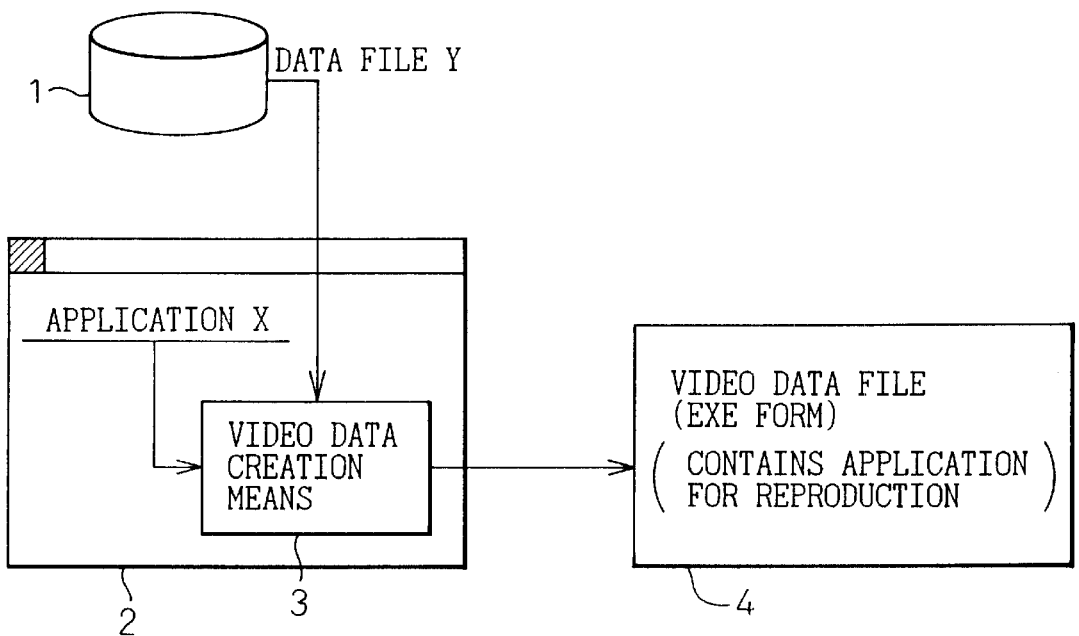
FIG. 2 is a diagram showing the basic functional configuration of the present invention.

The basic functional configuration of the present invention is shown in FIG. 2. In FIG. 2, reference numeral 1 is a storage device, 2 is an application processing means, 3 is a video data creation means, and 4 is an executable video data file.

The invention is embodied primarily in the following three aspects.

According to the first aspect of the invention, in a video data file creation apparatus incorporating a computer equipped with a graphical user interface, a video data creation means 3 is provided that edits display data shown on a display and that creates an executable video data file by appending a display producing means to the edited data.

A data file to be processed in the application processing means 2 is retrieved from the storage device 1, and the video data creation means 3 provided in the application processing means 2 edits the video data file obtained by processing the data file, in accordance with a user-selected instruction item, and creates the executable video data file 4 by appending the display producing means to the edited video data file.

The executable video data file can thus be created in a simple manner, for example, in accordance with selected menu items, etc. As a result, the data file Y can be reproduced in the user-set format on a computer where the application X is not installed.

According to the second aspect of the invention, the video data creation means 3 predicts user action to be performed on the video data file obtained by processing the data file, edits the video data file in accordance with the predicted user action, and creates the executable video data file by appending the display producing means to the edited video data file.

This further simplifies the operating process, since the video data creation means creates the video data file by predicting the main target of the user action.

According to the third aspect of the invention, the video data creation means 3 within the application processing means, which is independent of the application, analyzes the application by which the input data file is created, edits the video data file on the basis of the setting operation performed on the input data file on the application, and creates the executable video data file by appending the display producing means to the edited video data file.

Here, since the application is analyzed by the independent video data creation means, the video data file can be created in the user-set format without activating that application.

The present invention will now be described in detail below by way of the preferred embodiments thereof.

Figure 3:
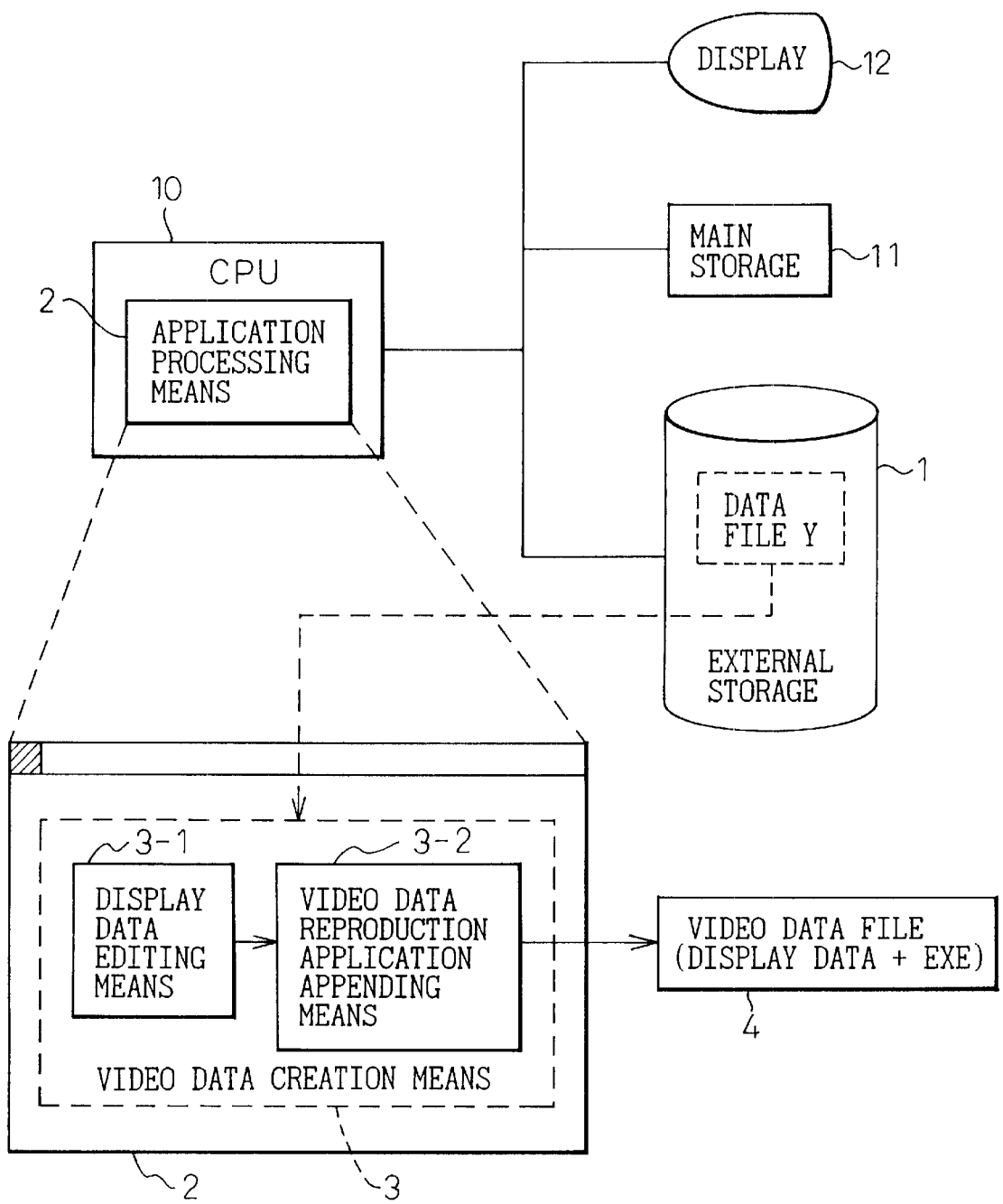
FIG. 3 is a diagram showing a first embodiment of the present invention.
Figure 4:
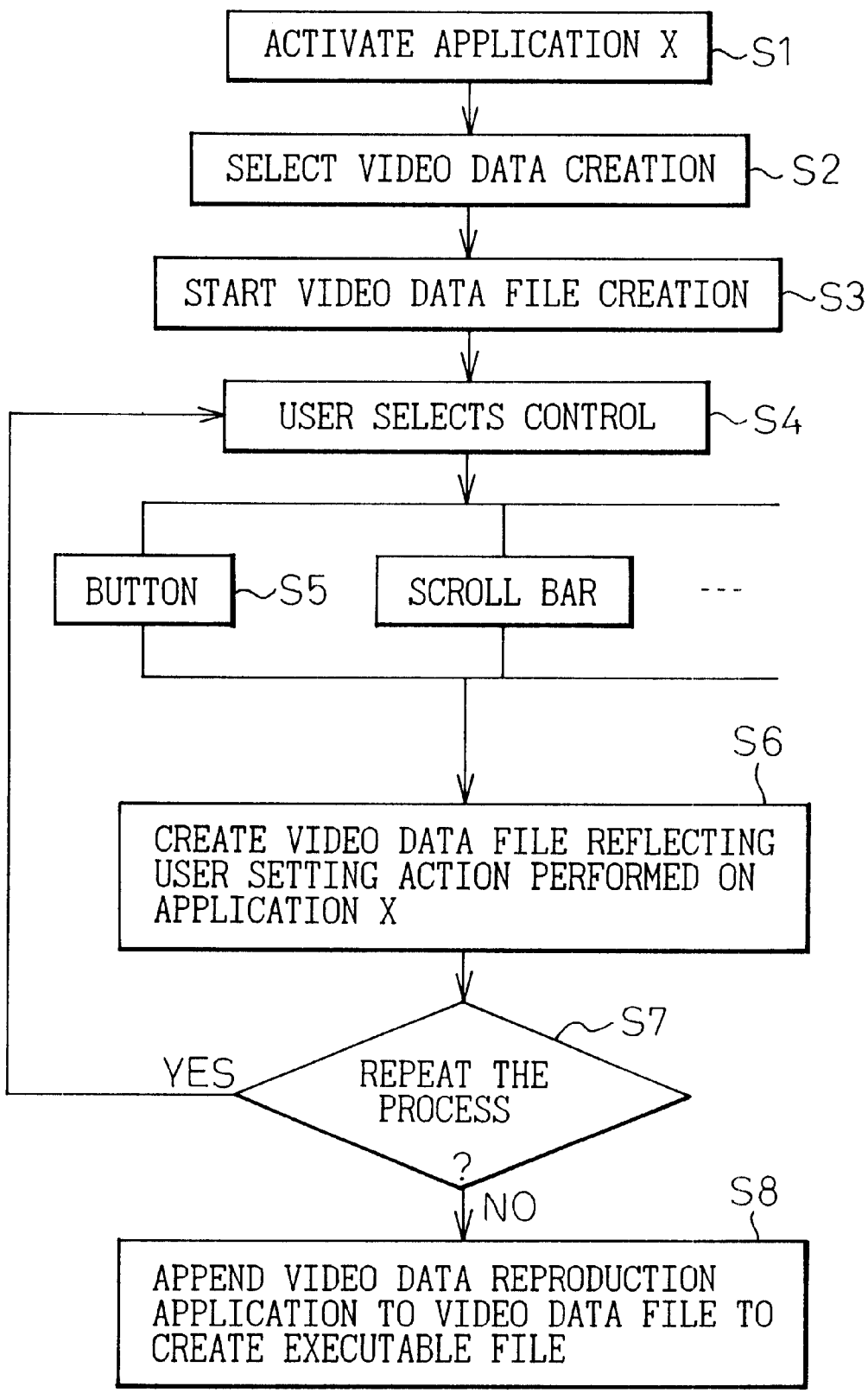
FIG. 4 is an explanatory diagram illustrating the operation in FIG. 3.

Referring to FIGS. 3 and 4, a first embodiment of the invention will be described, dealing with an example in which the data is a document. FIG. 3 is a diagram showing the configuration of the first embodiment, and FIG. 4 is an explanatory diagram illustrating the operation thereof.

In FIG. 3, reference numeral 1 is an external storage device, 2 is an application processing means, 3 is a video data creation means, 4 is a video data file, 10 is a CPU, 11 is a main storage device, and 12 is a display device.

The external storage device 1 stores data such as a data file Y edited by the application processing means 2 which is, for example, a word processing program from Company A.

The application processing means 2, which is, for example, the word processing program from Company A, incorporates the video data creation means 3 and has a graphical user interface operating on a computer system. The video data creation means 3 includes a display data editing means 3-1 for editing display data presented on the display device 12 on the basis of the data file Y displayed on the display device 12, and a video data reproduction application appending means 3-2 for appending to the edited display data an executing program that enables the display data to be viewed on a personal computer where the word processing program from Company A is not installed. The video data creation means 3 thus outputs the video data file 4 of an executable form (hereinafter referred to as an EXE form) by appending the display executing program to the display data created based on the data file Y. In this way, the video data file is created that exactly reflects the user actions performed with the application processing means 2 after initiating the video data file creation process.

The CPU 10 performs various data processing operations for document creation, image processing, calculations, etc., in accordance with various application programs loaded into the main storage device 11.

The main storage device 11 stores various programs and data for operating the CPU 10.

The display device 12 displays the results of the operations performed by the CPU 10, messages or symbols requesting the input of data necessary for operations, etc.

FIG. 4 is a flowchart illustrating one example of the operation in FIG. 3.

In FIG. 4, first, the user activates the application X, that is, the application processing means 2 (S1). The application processing means 2 displays a menu on the display device 12 from within the application X. Then, the user selects a video data creation item from the menu by using, for example, a mouse, to create a video data file (S2). In response to the selection of the video data creation item, the application processing means 2 starts the video data creation means 3 incorporated therein (S3).

Next, the user selects a desired item (S4) from a prescribed control item menu (S5) provided in the application processing means 2. For example, when drawing an underline, the user selects an underline item button, and when he desires to scroll the screen, he selects a scroll bar item, for example. In this way, the user selects various control items as he desires (S7). In addition to these screen manipulation items, other items such as a text frame for converting text into a designated text format, for example, a circulating format, and header and footer setting items, can be included in the menu items.

The display data editing means 3-1 in the video data creation means 3 incorporated in the application processing means 2 thus creates a video data file sequentially recording the process in which the data file Y is displayed on the screen in accordance with the selected control items (S6).

The user repeats the above process as many times as necessary (S7). After repeating the process the necessary number of times, the user selects the termination of the process (NO), upon which the video data reproduction application appending means 3-2 appends a display executing program for video data reproduction to the video data file created by the display data editing means 3-1 and outputs the video data file 4 of EXE form (S8).

Since the display executing program is incorporated in the video data file 4 of an EXE form, the video data file can be reproduced on a computer where the particular application is not installed.

Next, a second embodiment of the present invention will be described with reference to FIGS. 5 and 6.

Figure 5:
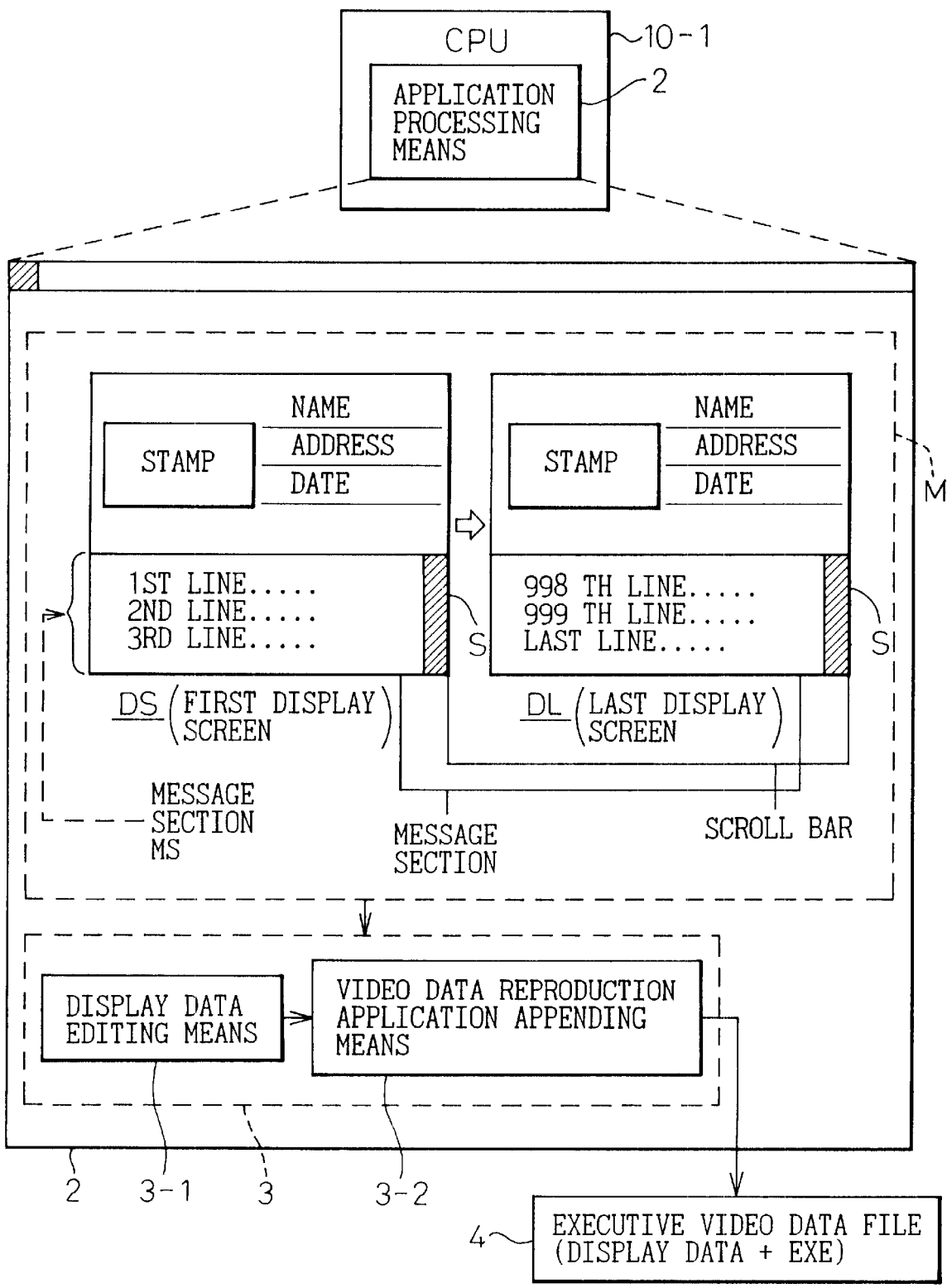
FIG. 5 is a diagram showing a second embodiment of the present invention.
Figure 6:
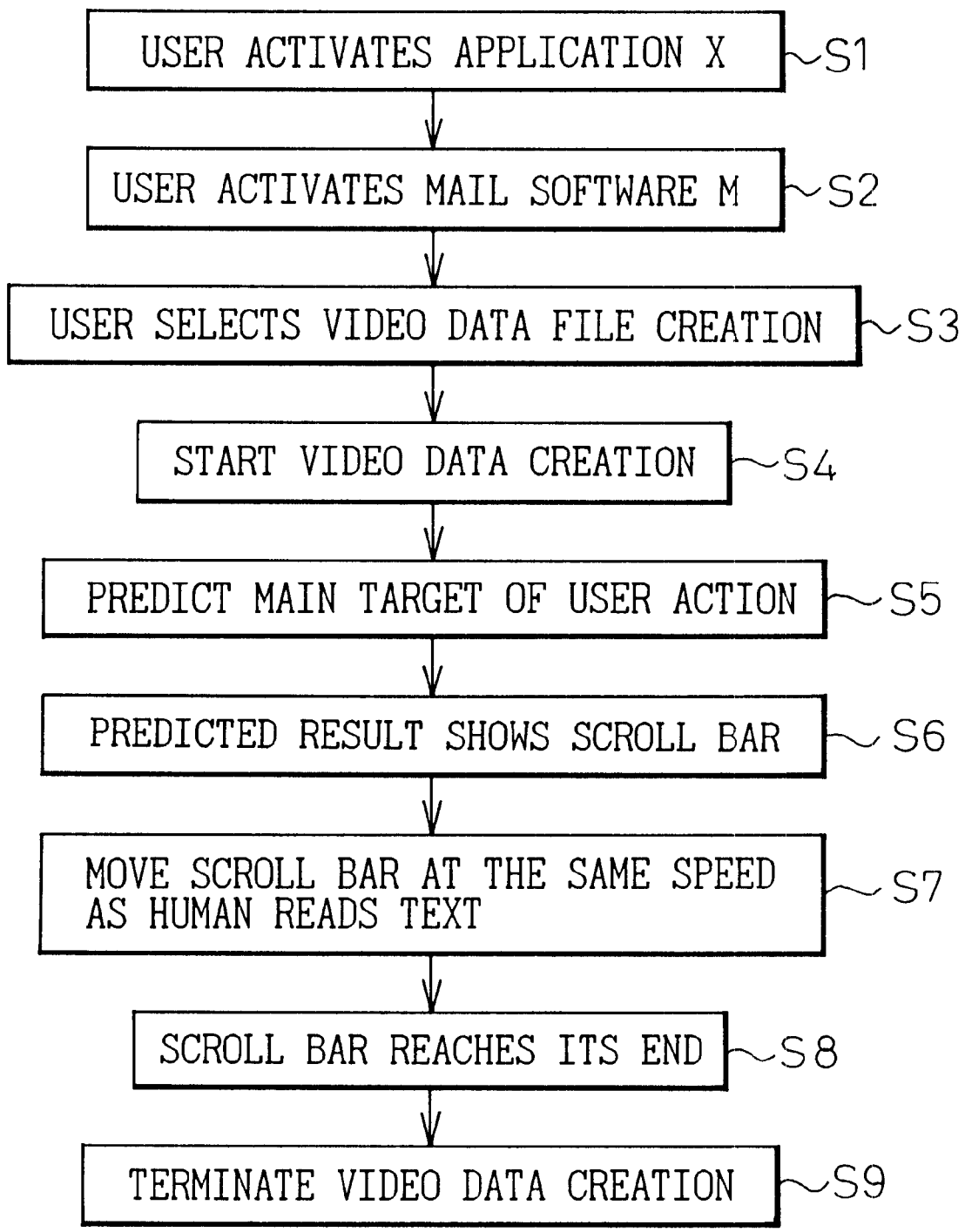
FIG. 6 is an explanatory diagram illustrating the operation in FIG. 5.

FIG. 5 is a diagram showing the configuration of the second embodiment of the invention, and FIG. 6 is an explanatory diagram illustrating the operation thereof.

The second embodiment of the invention concerns the case where the display format is more or less predefined, for example, the upper half of the display area being for an address and the lower half for a message, as in mail software, and the user action on it is limited to particular items (for example, scrolling the mail display). Here, the application processing means predicts the action the user is supposed to perform, and automatically performs processing as if it is performed by the user (for example, automatic setting of scrolling action).

In FIG. 5, reference numeral 2 is the application processing means, which is, for example, a word processing program from Company A and which contains mail software M. The operation in FIG. 5 will be described below with reference to FIG. 6.

In FIG. 6, when the computer receives mail, for example, first the user activates the application X, that is, the application processing means 2 (S1). The application processing means 2 displays a menu on the display device. To display the received mail, the user selects a mail display item using, for example, a mouse, upon which the mail software M is activated (S2). When the mail software M is activated, a menu is displayed from which the user selects a video data file creation item (S3). The video data creation means 3 is thus started (S4).

In the illustrated example, the video data creation means 3 predicts the main target of the user action in the mail software M (S5). In this case, since the presence of the scroll bar (S) is detected, the scroll bar is used as the key to predict that the main target of the user action is the scroll bar (S6). The video data creation means 3 scrolls the message section (MS) where the scroll bar S is located, at the same speed as a human reads the text, thus reading the message section (MS); this process is presented to the display data creation means (S7). The display data creation means thus creates the video data file. Creation of the video data file continues automatically until the scroll bar S comes to its end as if it had been moved by the user (S8).

When the scroll bar S comes to its end, the video data file creation in the display data editing means 3-1 is complete (S9). In this way, the video data file can be created by predicting the user action, without requiring the user to specifically select the control item of scroll bar. The above description has dealt with the scroll bar as an example, but it will be appreciated that the present invention is not limited to this particular example.

Next, a third embodiment of the present invention will be described with reference to FIG. 7, while also referring to FIG. 5 given above. The foregoing second embodiment has dealt with the process up to the creation of the video data file. The third embodiment further provides an executable video data file by incorporating a video data file reproduction application as described in the first embodiment.

Figure 7:
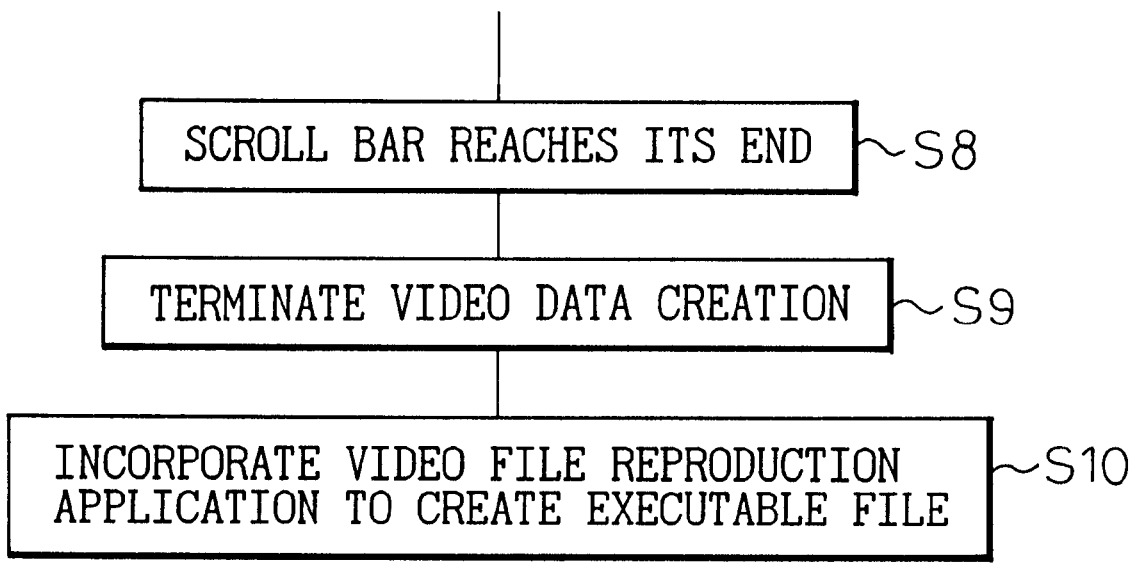
FIG. 7 is an explanatory diagram illustrating a third embodiment of the present invention.

FIG. 7 shows the operation flow in which step S10, for creating the executable video data file, is added at the end of the operation flow diagram of FIG. 6. The same steps S8 and S9 as shown in FIG. 6 are also shown in FIG. 7 for a clearer understanding of the flow. Explanation of S8 and S9 is therefore omitted here. When the video data file creation in the display data editing means 3-1 is complete in S9 as described with reference to FIG. 6, the video data reproduction application appending means 3-2 incorporates the video data file reproduction application into the video data file to create the executable video data file 4 (S10).

Thus, in the third embodiment, the video data file created in the second embodiment without requiring the user to select the corresponding control item can be converted into the executable video data file 4 which enables the video data to be reproduced on a computer not provided with reproducing means.

Figure 8:
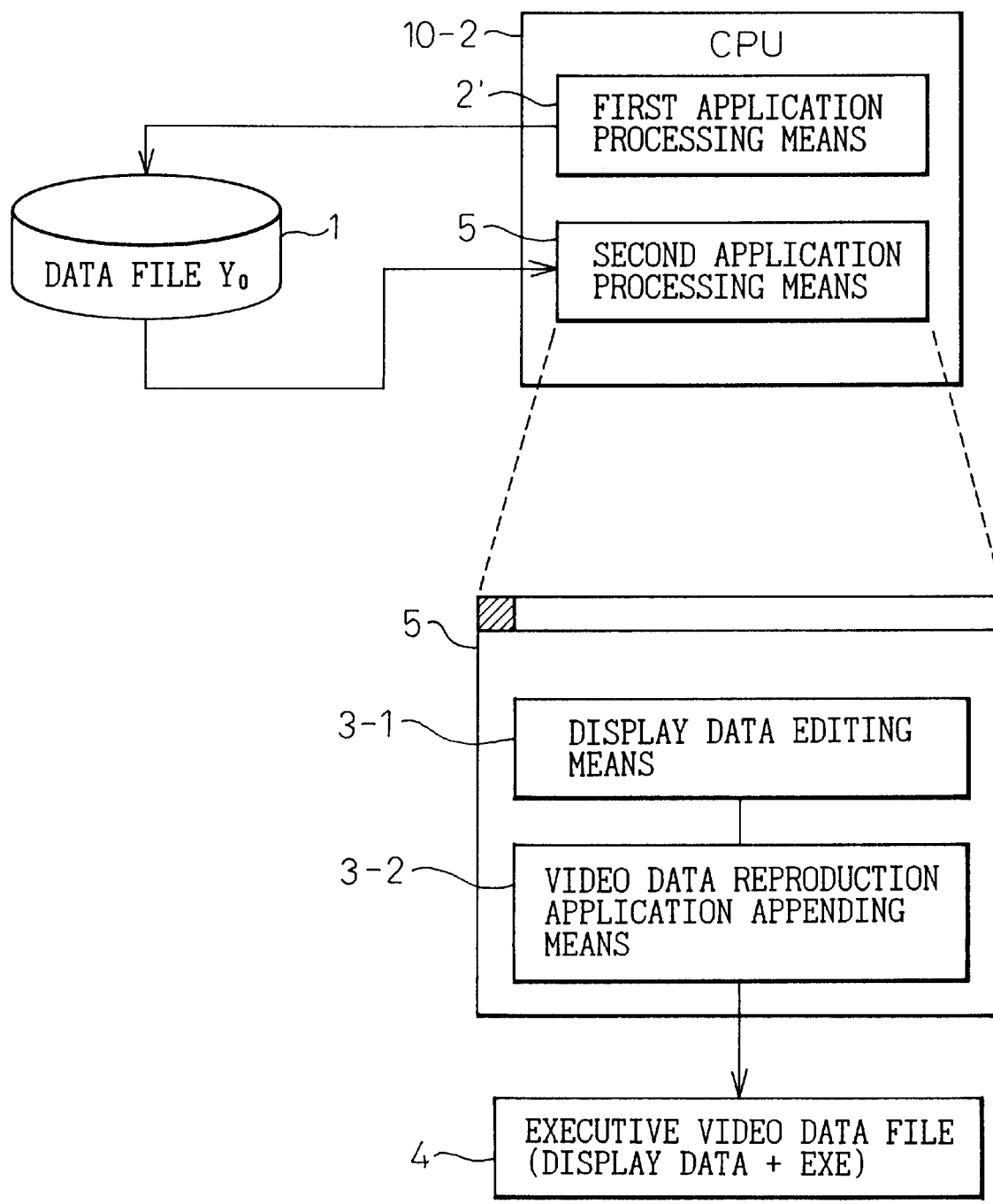
FIG. 8 is a diagram showing a fourth embodiment of the present invention.
Figure 9:
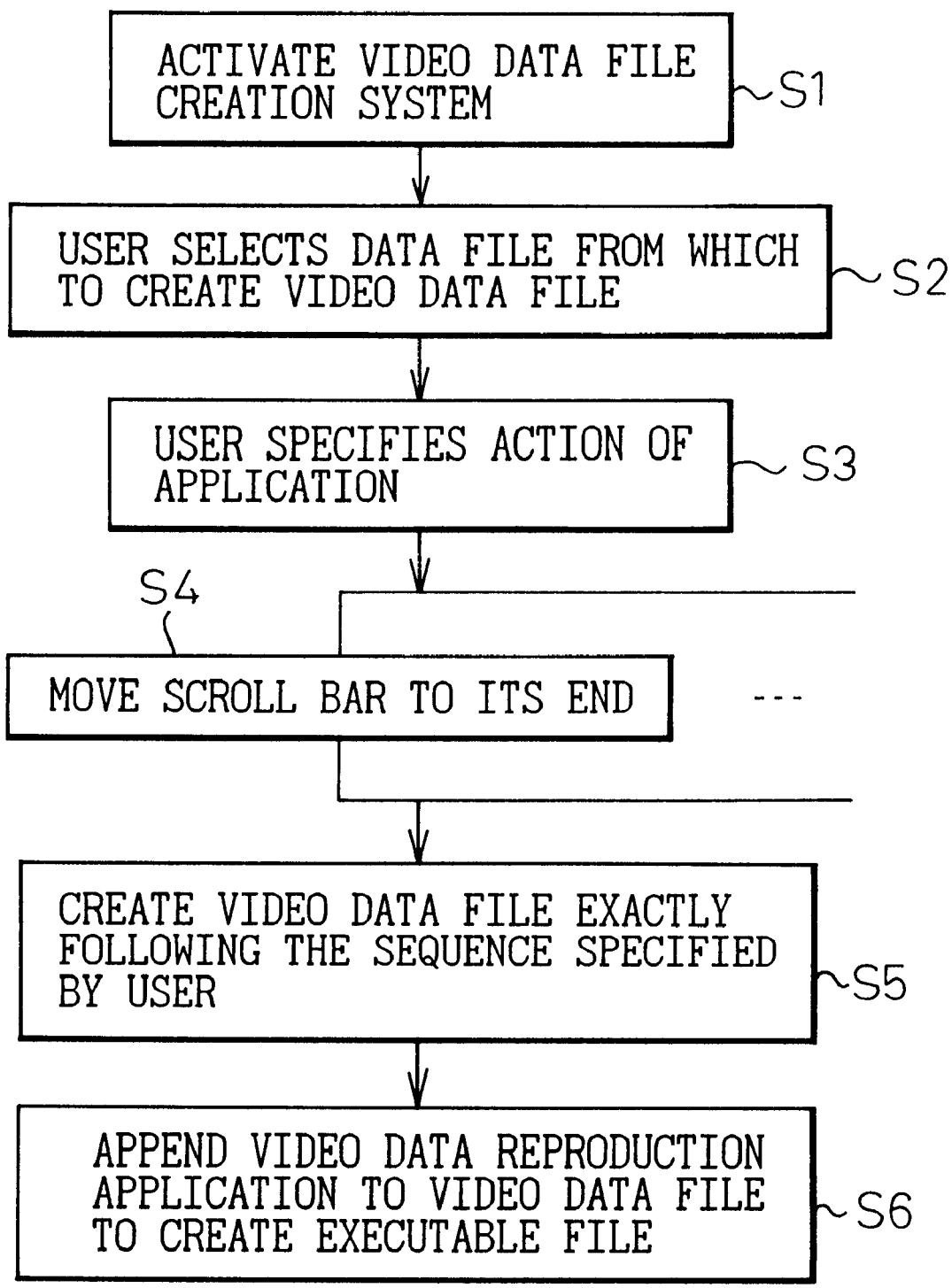
FIG. 9 is an explanatory diagram illustrating the operation in FIG. 8.

A fourth embodiment of the present invention will be described below with reference to FIGS. 8 and 9.

In the foregoing embodiments, the video data creation means 3 was incorporated in the application processing means 2 which was, for example, the word processing application from Company A. In other words, the application to be processed by the video data creation means 3 was predetermined. In the fourth embodiment, the video data file creation means 3 is provided as a second application processing means 5 which is a stand-alone application.

In the fourth embodiment, a document is edited, for example, by an application processing means 2' as a word processing program that does not incorporate a video data creation means, and the edited data file $Y_0$ is stored on the external storage device 1. The operation of the fourth embodiment will be described below with reference to the flowchart of FIG. 9.

First, the user activates the second application processing means 5 which is a stand-alone video data file creation application (S1). Then, the user selects the data file $Y_0$ from which to create a video data file, by either dragging it to the second application processing means 5 or specifying it from a prescribed dialog box (S2).

Next, the user specifies the action of the application appropriate to the data file $Y_0$ (S3). For example, if the data file $Y_0$ is a file created by the mail software contained in the first application processing means 2', the selected display item is set in the second application processing means 5, the video data file creation means for the data file $Y_0$, without activating the first application processing means 2' (S4). For example, when the mail software is specified, a setting is made, for example, to "move the scroll bar to its end."

When the setting is made, the display data editing means 3-1 in the second application processing means 5 operates exactly following the sequence specified by the user; for example, in the case of the "Move the scroll bar to its end" setting, the scroll bar on the data file $Y_0$ is moved to its end, and the video data file is created accordingly (S5). After the video data file is created, the video data reproduction application is incorporated into the thus created video data file to produce the executable video data file 4 (S6).

In this embodiment, the second application processing means as the video data file creation means is not integrated in other application processing means, but exists as an independent entity and analyzes and identifies the application corresponding to the data file at the time when the data file is specified by dragging, etc. (S2). Then, the video data file is created based on the analysis screen of the application and the item selected by the user; in this way, the video data file can be created in the user-set format without activating the application (S5). The video data file is then converted into the executable video data file incorporating the video data reproduction application in the user-set format, without running the application (S6).

The above explanation has dealt with the case where the user specifies the action of the application appropriate to the data file $Y_0$ in S3 and S4, but it will be appreciated that the invention is not limited to the illustrated example. For example, the action setting may be made by the second application processing means analyzing and predicting the application for the data file $Y_0$ in the same manner as described in the second and third embodiments.

Figure 10:
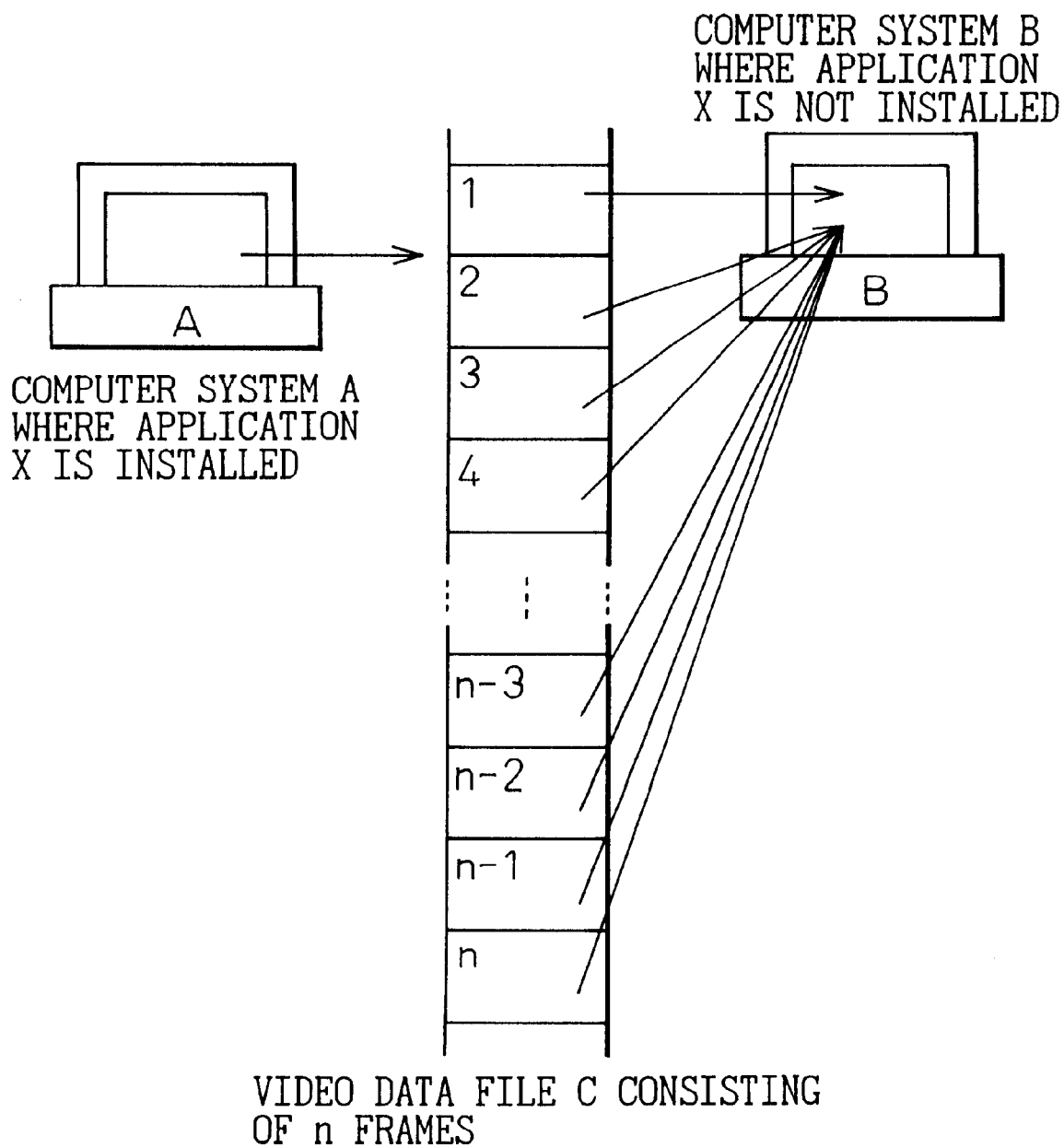
FIG. 10 is a diagram showing one example of how the present invention is utilized.

FIG. 10 is a diagram illustrating how the present invention is utilized.

As is apparent from the above explanation, according to the present invention, as shown in FIG. 10 the video data file created by the application X in the computer system A can be made viewable on the computer system B where the application X is not installed, by converting the data created by the application X into video data in the format selected by the user from menu items.

More specifically, in the computer system A where the application X is installed, the data displayed on the display screen is converted into an executable video data file C consisting of n frames, which is thus viewable on the computer system B where the application X is not installed. In this case, since action items are chosen from menus, not only is the operation easy, but the video data file can be created in a predefined form, greatly enhancing the convenience of use among various departments.

To summarize, the present invention provides the following effects.

(1) Since the video data file is created in a format predefined to a certain extent by using menus, the video data file is easy to use and provides a great convenience for use among different departments, etc. Further, since the video data file can be viewed as video data on computers where the corresponding application is not installed, there is no need to install many applications just for file viewing.

(2) Operation is simplified since the video data file is created by predicting user action without requiring the user to select control items.

(3) The video data file created without requiring the user to select control items can be viewed as video data on computers where the corresponding application is not installed.

(4) By providing a stand-alone video data file creation means having an application analysis function, the video data file can be created in the user-set format without activating the application.

(5) Further, since the video data file created in the user-set format without activating the application can be converted into a video data file executable for display viewing, the video data file can be displayed for viewing on computers where the corresponding application is not installed.

It should be noted that the present invention need not be restricted to a video data file. Rather, the present invention also relates to other types of data files such as graphic data files, multi-media files, etc.

What is claimed is:

1. A data file creation apparatus, comprising:

data creation means for editing display data shown on a screen of a first machine in accordance with a user-defined edit instruction item to specify a display mode of the display data, and appending a display-producing application to the display data, the display data being viewable according to the specified display mode by using the display-producing application; and display producing means for converting the edited display data appended with the display-producing application into an executable data file to be executed on a second machine to reproduce the display data according to the specified display mode on a screen of the second machine by using the appended display-producing application.

2. An apparatus according to claim 1, wherein said user-specified edit instruction item is given in the form of a menu item.

3. The apparatus according to claim 1, wherein said data creation means is incorporated as part of an application by which said data file to be displayed is created.

4. A data file creation apparatus, comprising:

data creation means for editing display data shown on a screen of a first machine in accordance with a user-defined edit instruction item to specify a display mode of the display data, and appending a display-producing application to the display data, the display data being viewable according to the specified display mode by using the display-producing application;

display producing means for converting the edited display data appended with the display-producing application into an executable data file to be executed on a second machine to reproduce the display data according to the specified display mode on a screen of the second machine by using the appended display-producing application; and data editing means for editing display data shown on the display into a designated format, wherein said data editing means predicts user action to be performed on a data file obtained by processing a data file to be displayed, and edits said data file in accordance with said predicted user action.

5. An apparatus according to claim 4, further comprising display producing means for converting said edited video data file into an executable data file.

6. An apparatus according to claim 4, wherein said predicted user action is for scrolling a text display screen area.

7. A data file creation apparatus, comprising:

data creation means for editing display data shown on a screen of a first machine in accordance with a user-defined edit instruction item to specify a display mode of the display data, and appending a display-producing application to the display data, the display data being viewable according to the specified display mode by using the display-producing application;

display producing means for converting the edited display data appended with the display-producing application into an executable data file to be executed on a second machine to reproduce the display data according to the specified display mode on a screen of the second machine by using the appended display-producing application; and data editing means for editing display data shown on the display into a designated format, wherein said data editing means analyzes the content of a data file to be displayed and, based on the result of said analysis, edits said data file in accordance with a user-specified edit instruction item.

8. An apparatus according to claim 7, further comprising display producing means for converting said edited video data file into an executable data file.

9. An apparatus according to claim 7, wherein said data editing means is provided as a stand-alone application.

10. An apparatus according to claim 9, wherein said data file to be displayed is dragged to said data editing means .

11. A method for creating a data file for viewing on a computer, comprising:

editing display data shown on a screen of a first machine in accordance with a user-specified edit instruction item to specify a display mode of the display data, and appending a display-producing application to the display data, the display data being viewable according to the specified display mode by using the display-producing application; and converting the edited display data appended with the display-producing application into an executable data file to be executed on a second machine to reproduce the display data according to the specified display mode on a screen of the second machine by using the appended display-producing application.

12. An apparatus according to claim 11, wherein said user-specified edit instruction item is given in the form of a menu item.

13. A method for creating a data file for viewing on a computer, comprising:

editing display data shown on a screen of a first machine in accordance with a user-specified edit instruction item to specify a display mode of the display data, and appending a display-producing application to the display data, the display data being viewable according to the specified display mode by using the display-producing application; and converting the edited display data appended with the display-producing application into an executable data file to be executed on a second machine to reproduce the display data according to the specified display mode on a screen of the second machine by using the appended display-producing application, wherein said data file is edited in accordance with a predicted user action.

14. A method according to claim 13, further comprising converting said edited data file into an executable data file.

15. A method for creating a data file for viewing on a computer, comprising:

creating a corresponding data file by analyzing the content of a data file to be displayed;

editing, based on the result of said analysis, said data file shown on a screen of a first machine in accordance with a user specified edit instruction item to specify a display mode of the display data, and appending a display-producing application to the display data, the display data being viewable according to the specified display mode by using the display-producing application; and converting the edited display data appended with the display-producing application into an executable data file to be executed on a second machine to reproduce the display data according to the specified display mode on a screen of the second machine by using the appended display-producing application.

16. A recording medium recording a computer-readable program for implementing the operations of:

editing display data shown on a screen of a first machine in accordance with a user-specified edit instruction item to specify a display mode of the display data, and appending a display-producing application to the display data, the display data being viewable according to the specified display mode by using the display-producing application; and converting the edited display data appended with the display-producing application into an executable data file to be executed on a second machine to reproduce the display data according to the specified display mode on a screen of the second machine by using the appended display-producing application.

17. A recording medium recording a computer-readable program for implementing the operations of:

editing display data shown on a screen of a first machine in accordance with a user-specified edit instruction item to specify a display mode of the display data, and appending a display-producing application to the display data, the display data being viewable according to the specified display mode by using the display-producing application; and converting the edited display data appended with the display-producing application into an executable data file to be executed on a second machine to reproduce the display data according to the specified display mode on a screen of the second machine by using the appended display-producing application, wherein said data file is edited in accordance with a predicted user action.

18. A recording medium according to claim 17, wherein said program further includes the function of converting said edited data file into an executable data file.

19. A recording medium recording a computer-readable program for implementing the operations of:

processing a data file to be displayed and creating a corresponding data file, including display data, therefrom;

creating a data file by using said corresponding processing function obtained by analyzing the content of said data file to be displayed;

editing, based on the result of said analysis, said data file shown on a screen of a first machine in accordance with a user specified edit instruction item to specify a display mode of the display data, and appending a display-producing application to the display data, the display data being viewable according to the specified display mode by using the display-producing application; and converting said edited data file appended with the display-producing application into an executable data file to be executed on a second machine to reproduce the display data according to the specified display mode on a screen of the second machine by using the appended display-producing application.

20. A data file creation apparatus, comprising:

a data creation unit to edit display data shown on a screen of a first machine in accordance with a user-defined edit instruction item to specify a display mode of the display data, and appending a display-producing application to the display data, the display data being viewable according to the specified display mode by using the display-producing application; and a display conversion unit to convert the edited display data appended with the display-producing application into an executable data file to be executed on a second machine to reproduce the display data according to the specified display mode on a screen of the second machine by using the appended display-producing application.

21. A data file creation apparatus, comprising:

a data creation unit to edit display data shown on a screen of a first machine in accordance with a user-defined edit instruction item to specify a display mode of the display data, and appending a display-producing application to the display data, the display data being viewable according to the specified display mode by using the display-producing application;

a display conversion unit to convert the edited display data appended with the display-producing application into an executable data file to be executed on a second machine to reproduce the display data according to the specified display mode on a screen of the second machine by using the appended display-producing application; and a data editor to edit display data shown on the display into a designated format, wherein said data editing means predicts user action to be performed on a data file obtained by processing a data file to be displayed, and edits said data file in accordance with said predicted user action.

22. A data file creation apparatus, comprising:

a data creation unit to edit display data shown on a screen of a first machine in accordance with a user-defined edit instruction item to specify a display mode of the display data, and appending a display-producing application to the display data, the display data being viewable according to the specified display mode by using the display-producing application;

a display conversion unit to convert the edited display data appended with the display-producing application into an executable data file to be executed on a second machine to reproduce the display data according to the specified display mode on a screen of the second machine by using the appended display-producing application; and a data editor to edit display data shown on the display into a designated format, wherein said data editor analyzes the content of a data file to be displayed and, based on the result of said analysis, edits said data file in accordance with a user-specified edit instruction item.

* * * * *